(12) United States Patent
Kim (10) Patent No.: US 8,369,575 B2
(45) Date of Patent: Feb. 5, 2013

(54) 3D IMAGE PROCESSING METHOD AND APPARATUS FOR IMPROVING ACCURACY OF DEPTH MEASUREMENT OF AN OBJECT IN A REGION OF INTEREST

(75) Inventor: Seong Jin Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 626 days.

(21) Appl. No.: 12/591,218

(22) Filed: Nov. 12, 2009

(65) Prior Publication Data

US 2010/0290674 A1   Nov. 18, 2010

(30) Foreign Application Priority Data

May 14, 2009   (KR) .................. 10-2009-0041954

(51) Int. Cl.
*G06K 9/00*  (2006.01)
(52) U.S. Cl. .................... 382/106; 356/5.01
(58) Field of Classification Search .............. None
See application file for complete search history.

(56) References Cited

U.S. PATENT DOCUMENTS

| | | | |
|---|---|---|---|
| 6,323,942 B1 * | 11/2001 | Bamji | 356/5.01 |
| 6,567,116 B1 * | 5/2003 | Aman et al. | 348/169 |
| 2004/0153229 A1 * | 8/2004 | Gokturk et al. | 701/45 |
| 2006/0241371 A1 | 10/2006 | Rafii et al. | |

FOREIGN PATENT DOCUMENTS

| | | |
|---|---|---|
| KR | 2001-0093094 | 10/2001 |
| KR | 10-0458629 | 11/2004 |
| KR | 10-0519782 | 9/2005 |
| KR | 10-0788823 | 12/2007 |
| KR | 2008-0102826 | 11/2008 |
| WO | 2004/107272 | 12/2004 |

OTHER PUBLICATIONS

Alessandro Bevilacqua; Luigi Di Stefano; Pietro Azzari, "People Tracking Using a Time-of-Flight Depth Sensor", 2006, Proceedings of the IEEE International Conference on Video and Signal Based Surveillance.*

Ryohei Miyagawa and Takeo Kanade, "CCD-Based Range-Finding Sensor", Oct. 1997, IEEE Transactions on Electron Devices, vol. 44, No. 10, pp. 1648-1652.*

* cited by examiner

*Primary Examiner* — Andrew W Johns
*Assistant Examiner* — Siamak Harandi
(74) *Attorney, Agent, or Firm* — Staas & Halsey LLP (57) ABSTRACT

Example embodiments relate to a three-dimensional (3D) image processing apparatus and method that may determine a Region Of Interest (ROI) in an entire sensing region of the 3D image processing apparatus, and may obtain a depth image of the ROI. Also, example embodiments may be applied to a surveillance camera system, a motion detection system, a virtual reality simulation system, a distance recognition system for vehicles, a robotic system, a background separation system based on depth information, etc.

15 Claims, 9 Drawing Sheets

3D IMAGE PROCESSING METHOD AND APPARATUS FOR IMPROVING ACCURACY OF DEPTH MEASUREMENT OF AN OBJECT IN A REGION OF INTEREST

CROSS-REFERENCE TO RELATED APPLICATION

This application claims the benefit of Korean Patent Application No. 10-2009-0041954, filed on May 14, 2009, in the Korean Intellectual Property Office, the disclosure of which is incorporated herein by reference.

BACKGROUND

1. Field

Example embodiments relate to a three-dimensional (3D) image processing apparatus and method, and more particularly, to a 3D image processing apparatus and method that may improve a depth accuracy of a Region Of Interest (ROI).

2. Description of the Related Art

Depth information as well as color information of an object is required to capture a three-dimensional (3D) image of an object. An existing digital camera or camcorder may not provide a 3D image or video since it may obtain only color information. Accordingly, much research has been conducted to obtain depth information of a 3D image. In particular, a dense depth image in which every pixel has a depth value may be required to capture a 3D shape and motion and restore the 3D shape and motion as a 3D model on a two-dimensional (2D) display. Also, 3D images of an object are required to be obtained in real time. A depth image technology based on a Time of Flight (TOF), which is one of various methods of obtaining a depth image, may measure a time spent between when a light is emitted, reflected by an object, and returned. A depth image may be obtained in real time through the TOF-based depth image technology.

The TOF-based depth image technology may capture a shape or motion of a person or an object as a 3D image, and may be applied to a variety of fields, such as a surveillance camera system, a motion detection system, a virtual reality simulation system, a distance recognition system for vehicles, etc.

However, the TOF-based depth image technology in a current stage may not accurately capture a person or an object. Accordingly, a 3D image processing technology with a higher accuracy is required.

SUMMARY

A Time Of Flight (TOF)-based three-dimensional (3D) image processing apparatus that may improve depth accuracy is provided.

Additional aspects and/or advantages will be set forth in part in the description which follows and, in part, will be apparent from the description, or may be learned by practice of the invention.

According to example embodiments, there may be provided a 3D image processing method, including: determining a Region Of Interest (ROI) in an entire sensing region of a 3D image processing apparatus; modulating a pulse of an emitted light based on a depth from a reference point in relation to the 3D image processing apparatus to the ROI; and obtaining a depth image of the ROI using the pulse-modulated emitted light.

The determining may include: obtaining a depth image in the entire sensing region using an emitted light where an on-time period of a pulse having a modulation frequency of $f_{max}$ is $T_{max}$; and extracting depth information of the ROI from the depth image in the entire sensing region. $T_{max}$ may be a value obtained by converting a maximum sensing distance of the 3D image processing apparatus into a TOF.

The extracting may include: emitting the emitted light where the on-time period is $T_{max}$; receiving a reflected light of the emitted light where the on-time period is $T_{max}$; and extracting the depth information of the ROI based on a TOF between the reflected light and the emitted light where the on-time period is $T_{max}$.

The modulating may include: converting a starting point $Z_1$ and an end point $Z_2$ of the ROI into a TOF $T_1$ and a TOF $T_2$, respectively; and modulating the on-time period of the emitted light into a difference $(T_2-T_1)$ between the TOF $T_2$ and the TOF $T_1$.

The obtaining of the depth image; may include: modulating a duty cycle of a first transfer signal and a duty cycle of a second transfer signal to be identical to a duty cycle of the pulse-modulated emitted light; delaying the duty cycle-modulated first transfer signal by $T_1$, and delaying the duty cycle-modulated second transfer signal by $T_2$, $T_1$ and $T_2$ being obtained by converting the starting point $Z_1$ and the end point $Z_2$ of the ROI into a TOF, respectively; and obtaining the depth of the ROI using the duty cycle-modulated first transfer signal which is delayed by $T_1$, and using the duty cycle-modulated second transfer signal which is delayed by $T_2$.

The 3D image processing method may further include: determining whether an object located in the ROI moves outside of the ROI, after obtaining the depth image of the ROI; and resetting the ROI when the object moves outside of the ROI.

The resetting may include: obtaining the depth image in the entire sensing region using the emitted light where the on-time period is $T_{max}$; and extracting depth information from the depth image in the entire sensing region, the depth information being used to reset the ROI.

According to example embodiments, there may be provided a 3D image processing apparatus, including: an image signal processor to determine a Region of Interest (ROI) in an entire sensing region of the 3D image processing apparatus, and to control a pulse of an emitted light based on a depth from a reference point to the ROI; and a sensor unit to obtain a depth image under control of the image signal processor.

The image signal processor may include: an ROI determination unit determining the ROI in the entire sensing region of the 3D image processing apparatus; a control unit controlling a light module to modulate the pulse of the emitted light based on the depth from the reference point to the ROI; and a depth information computation unit computing the depth from depth images provided from the sensor unit.

The image signal processor may control the sensor unit to obtain the depth image in the entire sensing region using an emitted light where an on-time period is $T_{max}$, and extract depth information of the ROI from the depth image in the entire sensing region.

The image signal processor may control a light module to emit the emitted light where the on-time period is $T_{max}$, and extract the depth information of the ROI based on a TOF between the reflected light and the emitted light where the on-time period is $T_{max}$.

The image signal processor may control the light module to modulate the on-time period of the emitted light into a difference $(T_2-T_1)$ between $T_2$ and $T_1$.

The image signal processor may determine whether to reset the ROI for each frame of the depth image provided from the sensor unit.

The image signal processor may determine an ROI of an $m^{th}$ frame of the depth image, provided from the sensor unit, using an $m-1^{th}$ frame of the depth image provided from the sensor unit.

The sensor unit may modulate a duty cycle of a first transfer signal and a duty cycle of a second transfer signal to be identical to a duty cycle of the pulse-controlled emitted light.

BRIEF DESCRIPTION OF THE DRAWINGS

These and/or other aspects will become apparent and more readily appreciated from the following description of the example embodiments, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

Example embodiments may be applied to a surveillance camera system, a motion detection system, a virtual reality simulation system, a distance recognition system for vehicles, a robotic system, a background separation system based on depth information, and the like. However, the application is not limited to the above-described examples.

A depth information extraction technology that may be applied to a three-dimensional (3D) image processing apparatus according to example embodiments is described in detail.

Figure 1:
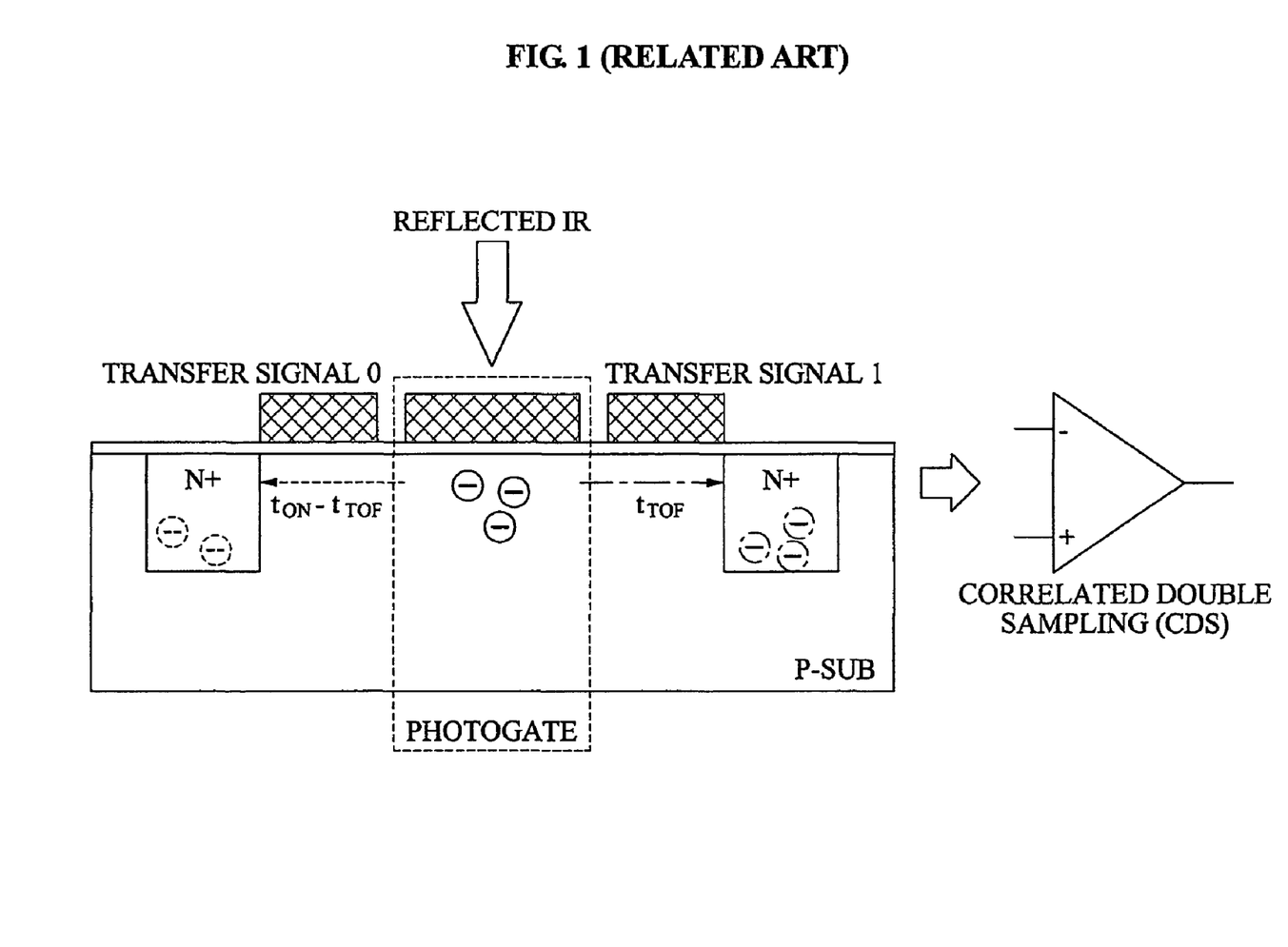
FIG. 1 illustrates an example of a method of extracting depth information in a related art.

FIG. 1 illustrates an example of a method of extracting depth information in a related art.

A Time Of Flight (TOF)-based depth capturing technology may detect a phase change when an emitted light with a modulated pulse is reflected by an object and returned. In this instance, the phase change may be calculated through an electric charge. An infrared (IR) ray which is invisible and harmless to humans may be used as the emitted light. Also, a depth pixel array, different from a general color sensor, may be used to detect a time difference between the emitted light and a reflected light.

The example of FIG. 1 is associated with a depth capturing technology using a photogate. Referring to FIG. 1, the photogate may receive a reflected IR, that is, a reflected light, and convert the reflected light into an electron-hole pair (EHP). A transfer gate in which a transfer signal is applied may be located on each of both sides of the photogate. In FIG. 1, a transfer signal 0 may be defined as a first transfer signal, and a transfer gate in which the first transfer signal is applied may be defined as a transfer 0. Also, a transfer signal 1 may be defined as a second transfer signal, and a transfer gate in which the second transfer signal is applied may be defined as a transfer 1.

Figure 3:
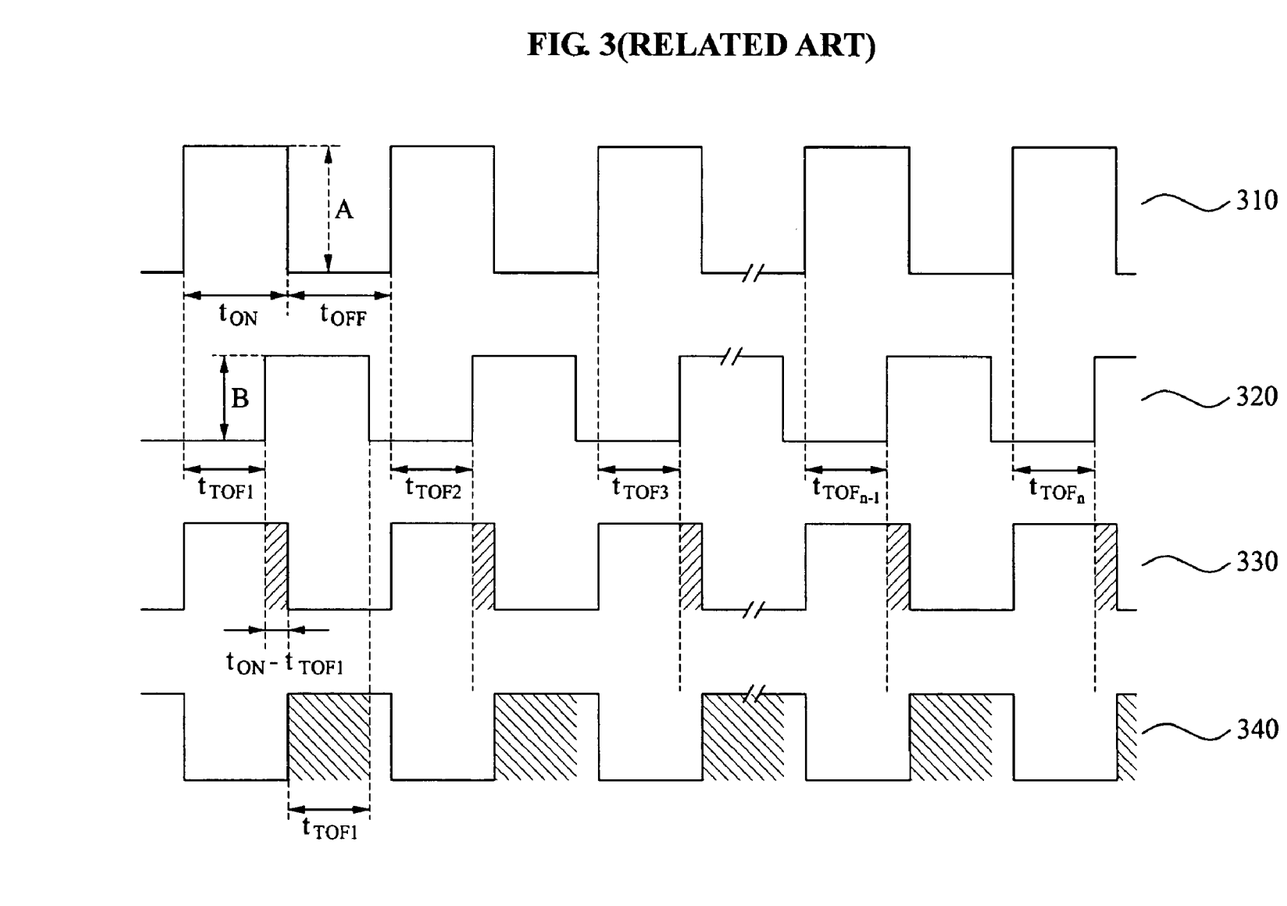
FIG. 3 illustrates a timing diagram of voltage applied to two transfer gates and a photogate.

The reflected light converted into the EHP may move to an 'n+' node according to a transfer signal. A timing diagram of a voltage, applied to two transfer gates and a photogate, to obtain a TOF between a reflected light and an emitted light is illustrated in FIG. 3. Referring to FIG. 3, a TOF between a pulse 320 of the reflected light and a pulse 310 of the emitted light may be $t_{TOF}$. A first transfer signal 330 may be applied to a transfer 0 without a phase difference with the pulse 310 of the emitted light. A second transfer signal 340 may have a phase difference of 180 degrees with the pulse 310 of the emitted light. In this instance, quantity of electric charge moving through the transfer 0 may be determined by the reflected light received in portions corresponding to a shaded portion of the first transfer signal 330. Also, quantity of electric charge moving through the transfer 1 may be determined by the reflected light received in portions corresponding to a shaded portion of the second transfer signal 340. The electrons moving through the transfer 0 and the electrons moving through the transfer 1 may be proportional to $t_{ON}-t_{TOFn}$ and $t_{TOFn}$, respectively. $t_{TOF}$ may correspond to a few nanoseconds (ns), which is a relatively short time. Accordingly, $t_{TOF}$ may be obtained by repeatedly measuring a quantity of electric charge generated through the transfer gates and accumulating the measured values. For example, $t_{TOF}$ may be calculated by, $$Q_{TR0} = N(t_{ON} - t_{TOF})i_{ir}$$
$$Q_{TR1} = Nt_{TOF}i_{ir}$$
$$\frac{Q_{TR0}}{Q_{TR1}} = \frac{t_{ON} - t_{TOF}}{t_{TOF}}$$
$$\therefore t_{TOF} = \frac{t_{ON}Q_{TR1}}{Q_{TR0} + Q_{TR1}} \rightarrow Z = \frac{c}{2}t_{TOF}$$

[Equation 1]

where N=1, 2, ..., n, $i_{ir}$ may denote a photocurrent generated by the reflected light, and c may denote the speed of light.

Figure 2:
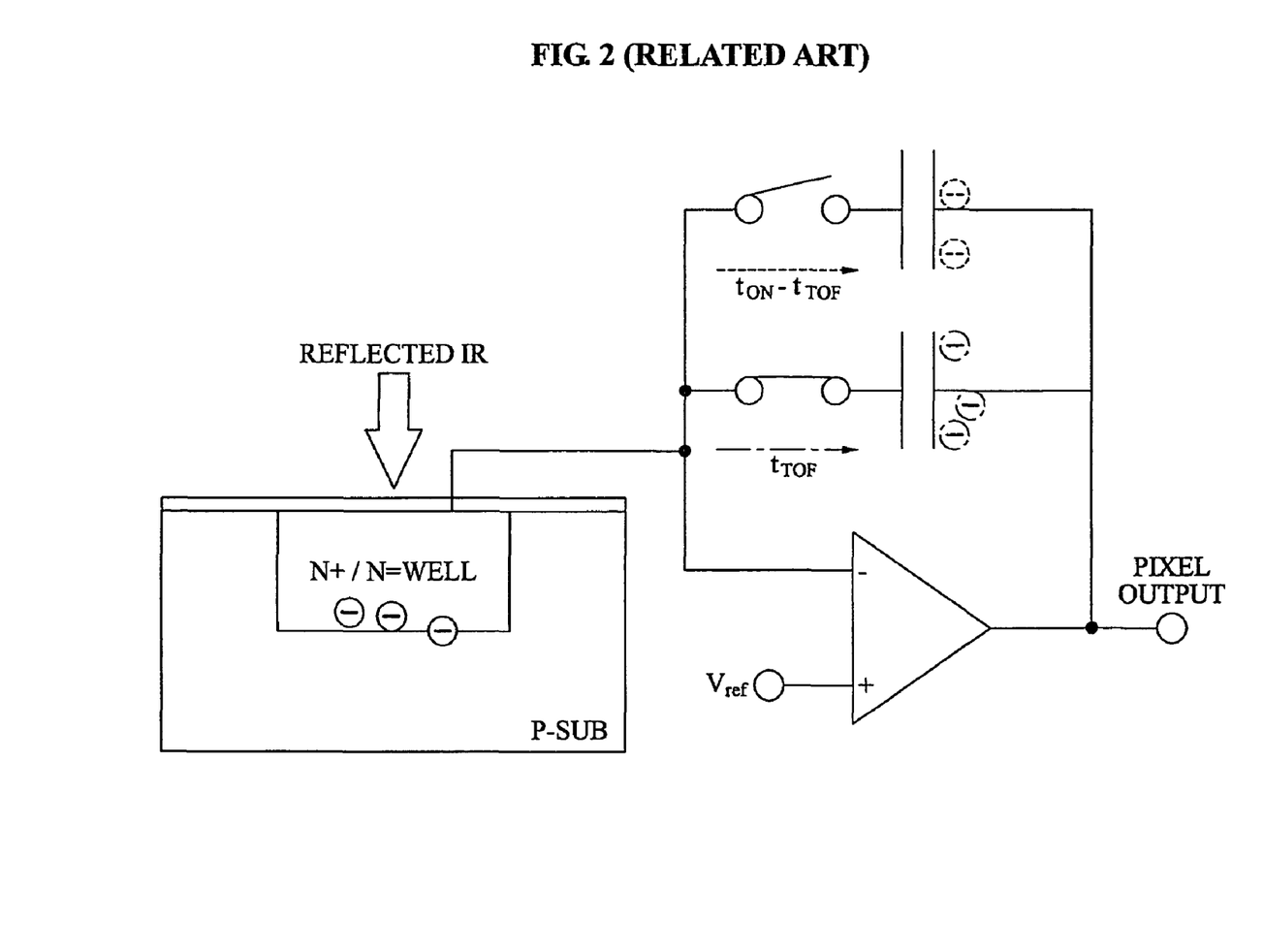
FIG. 2 illustrates another example of a method of extracting depth information in a related art.

FIG. 2 illustrates another example of a method of extracting depth information in a related art.

The example of FIG. 2 is associated with a depth capturing technology using a photodiode. Referring to FIG. 2, the depth capturing technology using a photodiode may obtain depth information utilizing a charge transfer circuit using a negative feedback loop. The depth capturing technology using a photodiode may have a same operating principle as a depth capturing technology using a photogate.

In the depth capturing technology using a photodiode and the depth capturing technology using a photogate, an intensity of a reflected light may be increased by increasing a sensitivity of the photodiode or photogate or by increasing a power of an emitted light, to improve an accuracy of a depth image. However, power consumption may also increase when the power of the emitted light increases. Also, when a modulation frequency of the emitted light increases or a duty cycle of a modulation pulse decreases in order to improve an accuracy of a depth image, a maximum distance of a sensible depth may be reduced.

Obtaining a precise depth value of a particular Region Of Interest (ROI) may be more appropriate than obtaining a depth image in an entire sensing region for a virtual reality experience system, etc., in which the 3D image processing apparatus and method may be applied. For example, since a user may be located away from a television (TV) by two or three meters in a virtual reality experience system, a depth value of a region between two and three meters or three and four meters may be significant in comparison with other regions, which may be identically applied to a surveillance camera system or an airbag system of a vehicle. Accordingly, the 3D image processing apparatus and method according to example embodiments may determine a particular region in an entire sensing region as an ROI, and improve an accuracy of depth information about the determined ROI.

Figure 4:
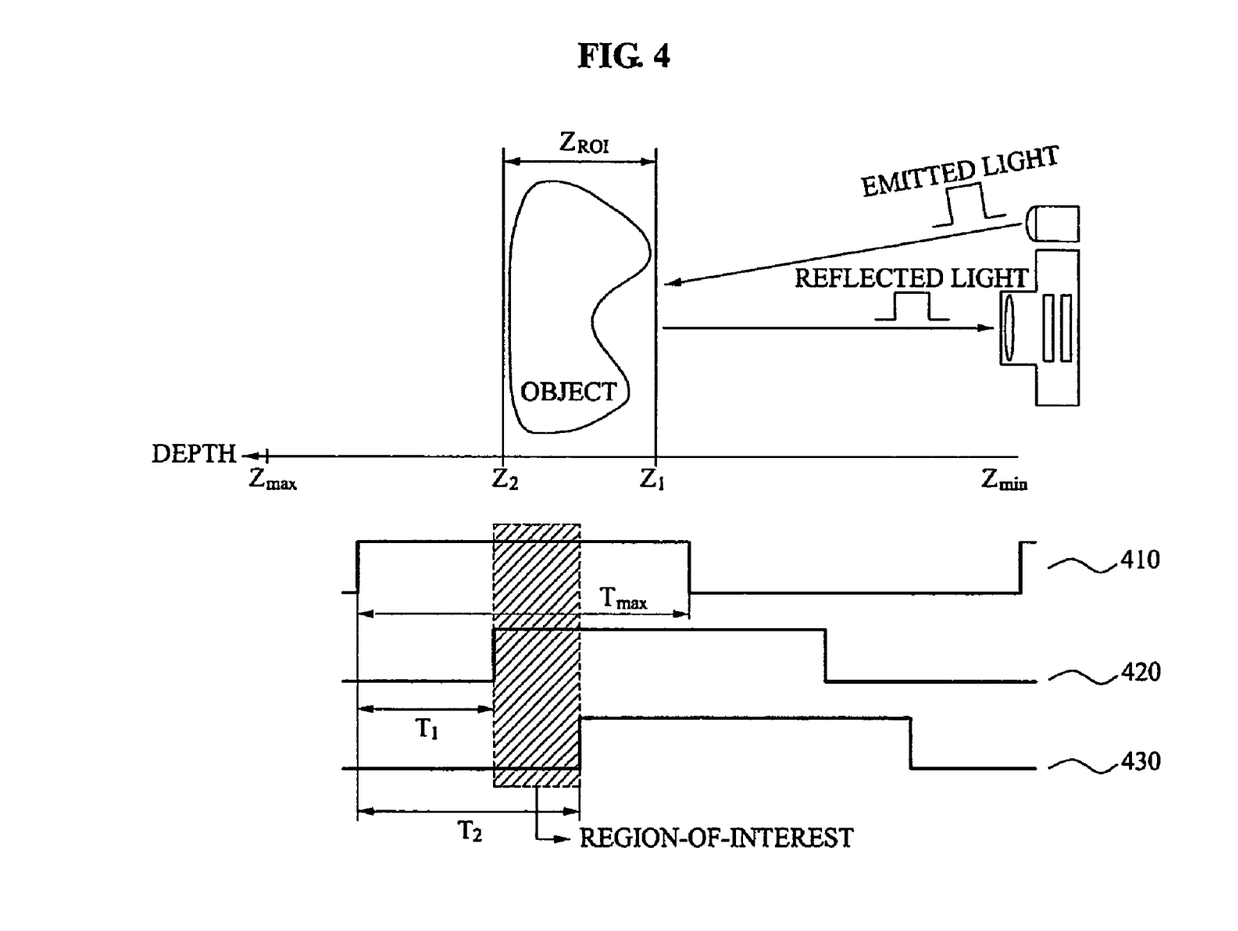
FIG. 4 illustrates an example that may be applied to an example operation of a 3D image processing apparatus.
Figure 5:
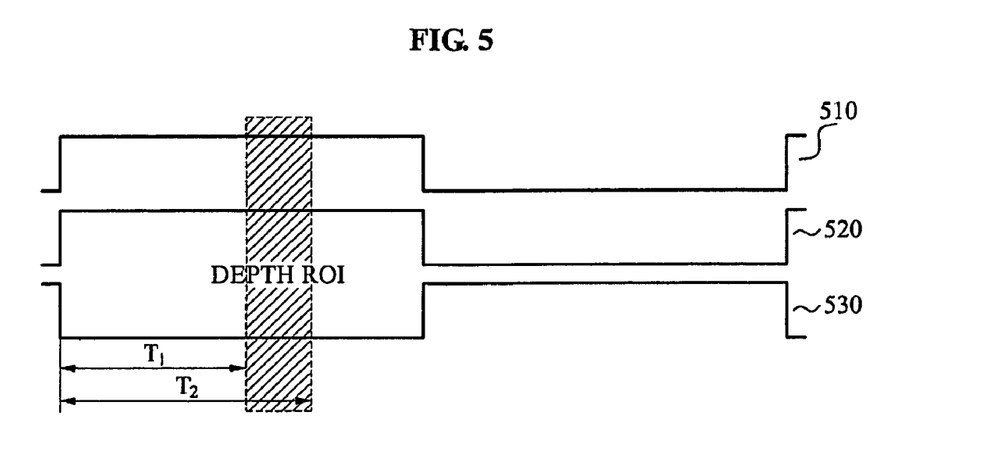
FIG. 5 illustrates an example of a pulse of an emitted light and an example of a pulse of a transfer signal.
Figure 6:
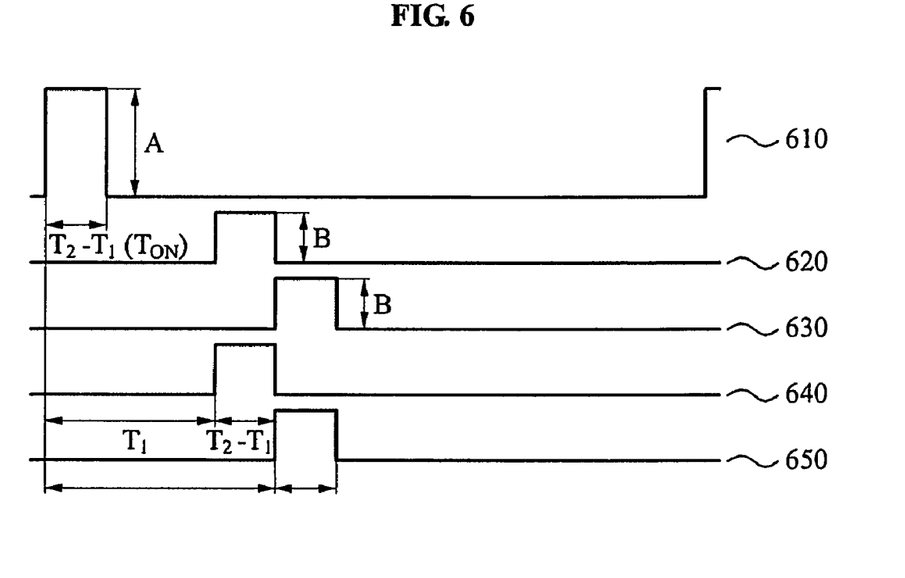
FIG. 6 illustrates an example of a modulated pulse to obtain only depth information of a Region Of Interest (ROI)

FIG. 4 illustrates an example that may be applied to an example operation of a 3D image processing apparatus. FIG. 5 illustrates an example of a pulse of an emitted light and an example of a pulse of a transfer signal. FIG. 6 illustrates an example of a modulated pulse to obtain only depth information of an ROI.

Referring to FIG. 4, it may be ascertained that an object is smaller than an entire sensing region ($Z_{max}-Z_{min}$). A maximum sensing distance $Z_{max}$ may be determined by a duty cycle and a pulse of an emitted light 410. An on-time period of the emitted light 410 may be $T_{max}$, and $T_{max}$ may be a value obtained by converting the maximum sensing distance $Z_{max}$ into a TOF. That is, a maximum sensing distance for depth may be determined by $T_{max}$. The object is located between $Z_1$ and $Z_2$ based on a reference point $Z_{min}$ in FIG. 4. Accordingly, $Z_1$ may be a starting point of an ROI $Z_{ROI}$, and $Z_2$ may be an end point of the ROI $Z_{ROI}$. $T_1$ may be obtained by converting $Z_1$ into a TOF by referring to a pulse 420 of the reflected light at $Z_1$ with respect to the emitted light 410. Also, $T_2$ may be obtained by converting $Z_2$ into a TOF by referring to a pulse 430 of the reflected light at $Z_2$ with respect to the emitted light 410. In this instance, a method to obtain $T_1$ and $T_2$ may use a variety of algorithms, such as the depth capturing technology using a photodiode and the depth capturing technology using a photogate. When $Z_1$ is determined, $Z_2$ may be set to be located away from $Z_1$ by a predetermined distance. Accordingly, only $T_1$ may be calculated using the depth capturing technology, and $T_2$ may be determined by adding a predetermined period of time to $T_1$.

Referring to FIG. 5, a pulse of a first transfer signal 520 and a pulse of an emitted light 510 may have a same phase, and a pulse of a second transfer signal 530 may have a phase opposite to the pulse of the emitted light 510.

Referring to FIG. 6, to obtain only depth information of an ROI, an on-time period of an emitted light 610 may be a difference $T_2-T_1$. A pulse of a transfer signal as well as a pulse of the emitted light 610 are to be modulated to obtain the depth information. In this instance, the pulse of the transfer signal may be set based on a TOF of each of a reflected light 620 and a reflected light 630. The reflected light 620 may be a light reflected at a starting point $Z_1$ of the ROI, and the reflected light 630 may be a light reflected at an end point $Z_2$ of the ROI. As illustrated in FIG. 6, a first transfer signal 640 may be modulated to be delayed by $T_1$ in comparison with the emitted light 610, and a second transfer signal 650 may be modulated to be delayed by $T_2$ in comparison with the emitted light 610. An on-time period of the first transfer signal 640 and the second transfer signal 650 may be a difference ($T_2-T_1$). In this instance, various types of transfer signals may be used depending on a configuration of a 3D image processing apparatus.

An accuracy of a depth image may be proportional to an intensity of an emitted light, and be inversely proportional to a duty cycle of the emitted light. Accordingly, the accuracy of the depth image may be improved by increasing the intensity of the emitted light and decreasing the duty cycle of the emitted light. As described with reference to FIG. 4 through FIG. 6, the accuracy of the depth image may be improved by modulating an on-time period of $T_{max}$ of the emitted light into the difference ($T_2-T_1$), that is, by decreasing the duty cycle of the emitted light. When the duty cycle decreases, an average power of the emitted light may be reduced, and thus the intensity of the emitted light may increase to A.

Figure 7:
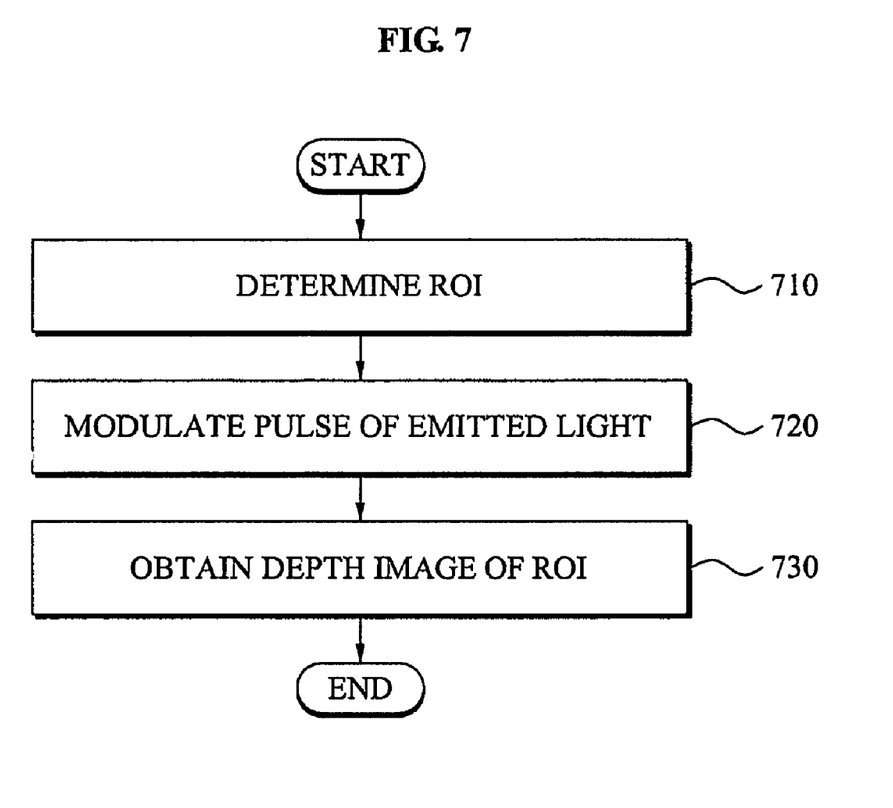
FIG. 7 illustrates a flowchart of a three-dimensional (3D) image processing method according to an example embodiment.

FIG. 7 illustrates a flowchart of a 3D image processing method according to an example embodiment. The 3D image processing method of FIG. 7 may be performed by a 3D image processing apparatus including an image signal processor.

Referring to FIG. 7, in operation 710, the 3D image processing apparatus may determine an ROI in an entire sensing region of the 3D image processing apparatus. In this instance, the 3D image processing apparatus may obtain a depth image in the entire sensing region using an emitted light where an on-time period is $T_{max}$, and may extract depth information of the ROI from the depth image in the entire sensing region. In this instance, the 3D image processing apparatus may emit the emitted light where the on-time period is $T_{max}$, may receive a reflected light of the emitted light where the on-time period is $T_{max}$, and may extract the depth information of the ROI based on a TOF between the reflected light and the emitted light where the on-time period is $T_{max}$.

In operation 720, the 3D image processing apparatus may modulate a pulse of the emitted light based on a depth from a reference point to the ROI. In this instance, the 3D image processing apparatus may convert a starting point $Z_1$ and an end point $Z_2$ of the ROI into a TOF $T_1$ and a TOF $T_2$, respectively, and modulate the on-time period of the emitted light into a difference ($T_2-T_1$) between the TOF $T_2$ and the TOF $T_1$.

In operation 730, the 3D image processing apparatus may obtain the depth image of the ROI using the pulse-modulated emitted light. In this instance: the 3D image processing apparatus may modulate a duty cycle of a first transfer signal and a duty cycle of a second transfer signal to be identical to a duty cycle of the pulse-modulated emitted light. Also, the 3D image processing apparatus may delay the duty cycle-modulated first transfer signal by $T_1$, and delay the duty cycle-modulated second transfer signal by $T_2$. Also, the 3D image processing apparatus may obtain the depth of the ROI using the duty cycle-modulated first transfer signal which is delayed by $T_1$, and using the duty cycle-modulated second transfer signal which is delayed by $T_2$.

Figure 8:
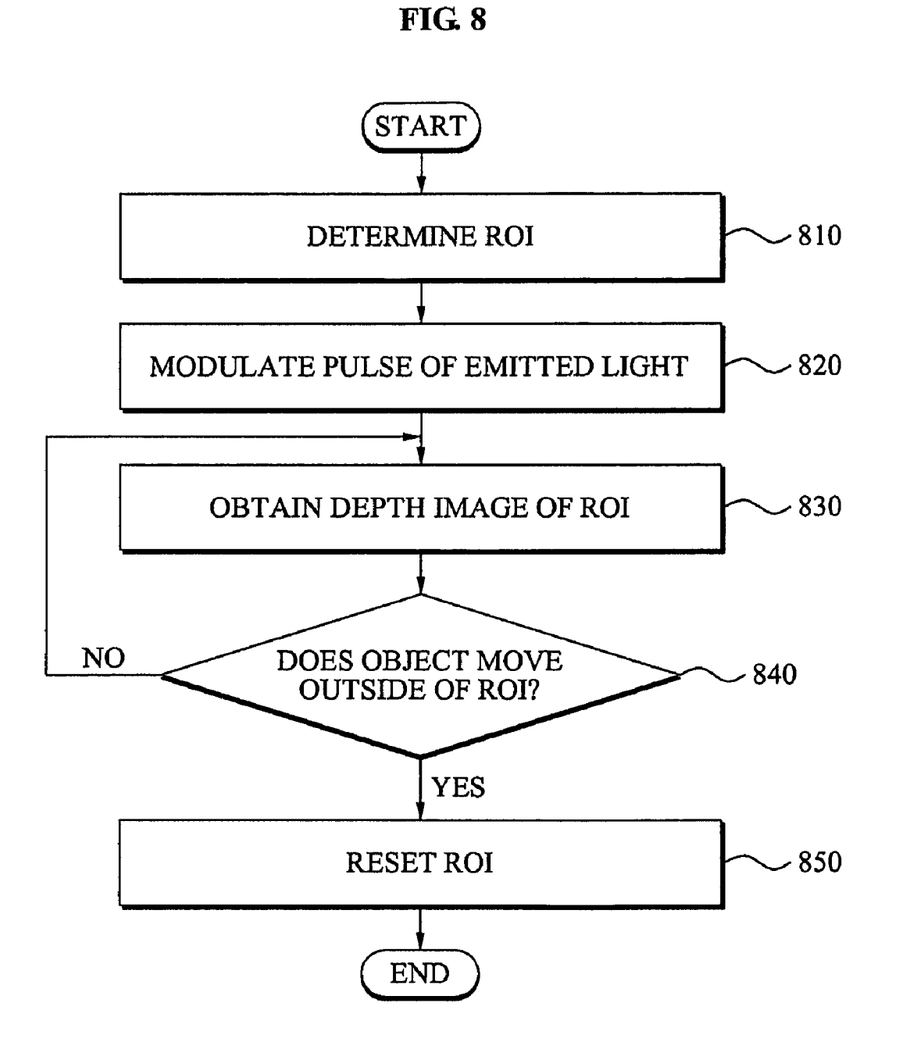
FIG. 8 illustrates a flowchart of a 3D image processing method according to another example embodiment.

FIG. 8 illustrates a flowchart of a 3D image processing method according to another example embodiment.

The 3D image processing method of FIG. 8 may be performed in a same manner as the 3D image processing method of FIG. 7. Accordingly, the 3D image processing method may perform determining in operation 810, modulating in operation 820, and obtaining in operation 830, which are identical, respectively, to the determining in operation 710, the modulating in operation 720, and the obtaining in operation 730. However, unlike the 3D image processing method of FIG. 7, the 3D image processing method of FIG. 8 may take an object into account, which is not fixed in an ROI and may move outside of the ROI. The 3D image processing method of FIG. 8 may determine an ROI of an $m^{th}$ frame of a depth image using an $m-1^{th}$ frame of the depth image. When the object is not fixed in the ROI, a depth of the $m^{th}$ frame may not be accurately obtained. Accordingly, the 3D image processing method determines whether to reset the ROI at every frame of the depth image, and feeds back whether to reset to a sensor unit or a timing generation unit.

Referring to FIG. 8, in operation 840, the 3D image processing method may determine whether the object located in the ROI moves outside of the ROI, after obtaining the depth image of the ROI in operation 830. When the object moves outside of the ROI, the depth image may not be obtained, and thus whether to reset may be easily determined. When the object is partially located outside of the ROI, a measured depth may be compared with $T_1$ and $T_2$, and thus whether to reset may be easily determined.

When it is determined that the object moves outside of the ROI, the 3D image processing method may reset the ROI in operation 850. An operation of resetting the ROI may be performed in a same way as the operation of setting of the ROI. In this instance, the 3D image processing method may obtain the depth image in the entire sensing region using the emitted light where the on-time period is $T_{max}$, and may extract depth information, used to reset the ROI, from the depth image in the entire sensing region. If the object does not move outside of the ROI, the procedure returns to operation 830 and the depth image of the ROI is obtained.

Figure 9:
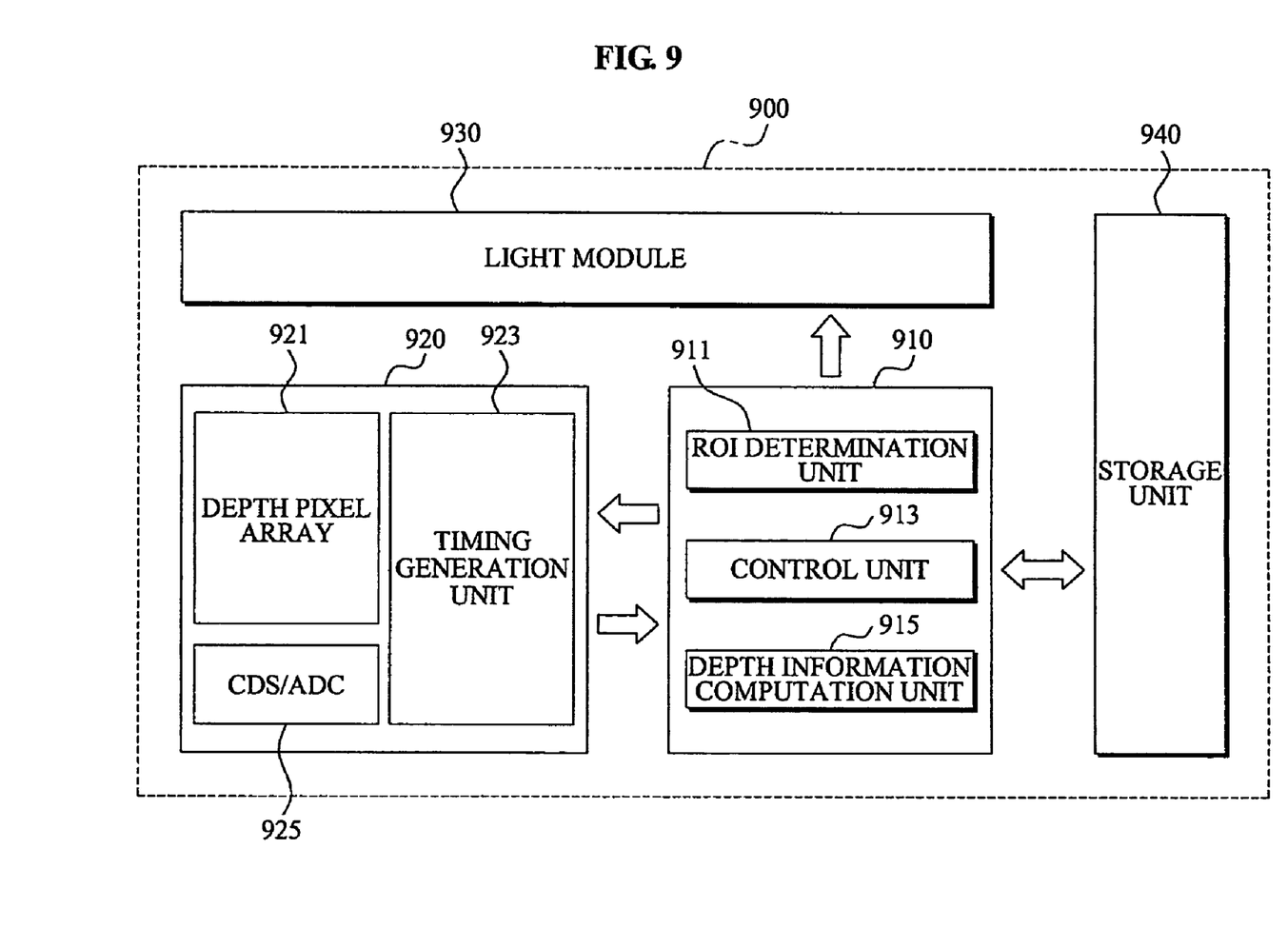
FIG. 9 illustrates a configuration of a 3D image processing apparatus according to example embodiments.

FIG. 9 illustrates a configuration of a 3D image processing apparatus 900 according to example embodiments.

The 3D image processing apparatus 900 may perform the 3D image processing method described with reference to FIG. 8 and FIG. 9.

Referring to FIG. 9, the 3D image processing apparatus 900 may include an image signal processor 910 and a sensor unit 920. Also, the 3D image processing apparatus 900 may further include a light module 930 that may emit an emitted light under control of the image signal processor 910. Also, the 3D image processing apparatus 900 may further include a storage unit 940 that may store depth images and depth information.

The image signal processor 910 may determine an ROI in an entire sensing region of the 3D image processing apparatus 900. Also, the image signal processor 910 may control a pulse of an emitted light based on a depth from a reference point to the ROI. In this instance, the image signal processor 910 may control the light module 930 to modulate the pulse of the emitted light.

The image signal processor 910 may include an ROI determination unit 911, a control unit 913, and a depth information computation unit 915. The ROI determination unit 911 may determine the ROI in the entire sensing region of the 3D image processing apparatus 900. The control unit 913 may control the light module 930 to modulate the pulse of the emitted light based on the depth from the reference point to the ROI. The depth information computation unit 915 may compute the depth from a depth image provided from the sensor unit 920.

The image signal processor 910 may control the sensor unit 920 to obtain the depth image in the entire sensing region using an emitted light where an on-time period is $T_{max}$. Also, the image signal processor 910 may extract depth information of the ROI from the depth image in the entire sensing region.

The image signal processor 910 may control the light module 930 to emit the emitted light where the on-time period is $T_{max}$, and may extract the depth information of the ROI based on a TOF between the reflected light and the emitted light where the on-time period is $T_{max}$. Also, the image signal processor 910 may control the light module 930 to modulate the on-time period of the emitted light into a difference ($T_2-T_1$) between $T_2$ and $T_1$.

The image signal processor 910 may determine whether to reset the ROI for each frame of the depth image provided from the sensor unit 920. Also, the image signal processor 910 may determine an ROI of an $m^{th}$ frame of the depth image, provided from the sensor unit 920, using an $m-1^{th}$ frame of the depth image provided from the sensor unit 920.

The sensor unit 920 may modulate a duty cycle of a first transfer signal and a duty cycle of a second transfer signal to be identical to a duty cycle of the pulse-controlled emitted light. Also, the sensor unit 920 may delay the duty cycle-modulated first transfer signal by $T_1$, and may delay the duty cycle-modulated second transfer signal by $T_2$.

The sensor unit 920 may include a depth pixel array 921, a timing generation unit 923, and a Correlated Double Sampler and Analog Digital Converter (CDS/ADC) 925. The depth pixel array 921 may be used to obtain the depth image, and the timing generation unit 923 may generate a timing diagram of a transfer signal. The CDS/ADC 925 may perform correlated double sampling and analog-to-digital converting.

The light module 930 may be variously configured. For example, the light module 930 may include a plurality of IR Light Emitting Diodes (LEDs) and an IR LED driver, but is not limited to such a configuration.

The 3D image processing methods described above may be performed by an image signal processor. The 3D image processing method according to the above-described example embodiments may be recorded in computer-readable media including program instructions to implement various operations to be executed by a computer. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few example embodiments have been shown and described, it would be appreciated by those skilled in the art that changes may be made in these example embodiments without departing from the principles and spirit of the disclosure, the scope of which is defined in the claims and their equivalents.

What is claimed is:

1. A three-dimensional (3D) image processing method, comprising:
   determining a Region Of Interest (ROI) in an entire sensing region of a 3D image processing apparatus;
   modulating a pulse of an emitted light based on a depth from a reference point in relation to the 3D image processing apparatus to the ROI; and
   obtaining a depth image of the ROI using the pulse-modulated emitted light
   wherein the determining comprises:
   obtaining a depth image in the entire sensing region using the emitted light where an on-time period of the emitted light is $T_{max}$, $T_{max}$ being a value obtained by converting a maximum sensing distance of the 3D image processing apparatus into a Time Of Flight (TOF).

2. The 3D image processing method of claim 1, wherein the determining further comprises:
   extracting depth information of the ROI from the depth image in the entire sensing region.

3. The 3D image processing method of claim 2, wherein the extracting comprises:

emitting the emitted light where the on-time period is $T_{max}$;

receiving a reflected light of the emitted light where the on-time period is $T_{max}$; and extracting the depth information of the ROI based on the TOF between the reflected light and the emitted light where the on-time period is $T_{max}$.

4. A three-dimensional (3D) image processing method, comprising:

determining a Region Of Interest (ROI) in an entire sensing region of a 3D image processing apparatus;

modulating a pulse of an emitted light based on a depth from a reference point in relation to the 3D image processing apparatus to the ROI; and obtaining a depth image of the ROI using the pulse-modulated emitted light, wherein the modulating comprises:

converting a starting point $Z_1$ and an end point $Z_2$ of the ROI into a Time Of Flight (TOF) $T_1$ and a TOF $T_2$, respectively; and modulating an on-time period of the emitted light into a difference $(T_2-T_1)$ between the TOF $T_2$ and the TOF $T_1$.

5. A three-dimensional (3D) image processing method, comprising:

determining a Region Of Interest (ROI) in an entire sensing region of a 3D image processing apparatus;

modulating a pulse of an emitted light based on a depth from a reference point in relation to the 3D image processing apparatus to the ROI; and obtaining a depth image of the ROI using the pulse-modulated emitted light, wherein the obtaining of the depth image comprises:

modulating a duty cycle of a first transfer signal and a duty cycle of a second transfer signal to be identical to a duty cycle of the pulse-modulated emitted light;

delaying the duty cycle-modulated first transfer signal by $T_1$, and delaying the duty cycle-modulated second transfer signal by $T_2$, $T_1$ and $T_2$ being obtained by converting a starting point $Z_1$ and an end point $Z_2$ of the ROI into a Time Of Flight (TOF), respectively; and obtaining the depth of the ROI using the duty cycle-modulated first transfer signal which is delayed by $T_1$ and using the duty cycle-modulated second transfer signal which is delayed by $T_2$.

6. The 3D image processing method of claim 1, further comprising:

determining whether an object located in the ROI moves outside of the ROI, after obtaining the depth image of the ROI; and resetting the ROI when the object moves outside of the ROI.

7. The 3D image processing method of claim 6, wherein the resetting comprises:

obtaining the depth image in the entire sensing region using an emitted light where an on-time period of the emitted light is $T_{max}$, $T_{max}$ being a value obtained by converting a maximum sensing distance of the 3D image processing apparatus into a Time Of Flight (TOF); and extracting depth information from the depth image in the entire sensing region, the depth information being used to reset the ROI.

8. A three-dimensional (3D) image processing apparatus, comprising:

an image signal processor to determine a Region Of Interest (ROI) in an entire sensing region of the 3D image processing apparatus and to control a pulse of an emitted light based on a depth from a reference point in relation to the image signal processor to the ROI; and a sensor unit to obtain a depth image under control of the image signal processor, wherein the image signal processor controls the sensor unit to obtain the depth image in the entire sensing region using the emitted light where an on-time period of the emitted light is $T_{max}$, $T_{max}$ being a value obtained by converting a maximum sensing distance of the 3D image processing apparatus into a Time Of Flight (TOF).

9. The 3D image processing apparatus of claim 8, wherein the image signal processor comprises:

an ROI determination unit to determine the ROI in the entire sensing region of the 3D image processing apparatus;

a control unit to control a light module to modulate the pulse of the emitted light based on the depth from the reference point to the ROI; and a depth information computation unit to compute the depth from a depth image provided from the sensor unit.

10. The 3D image processing apparatus of claim 8, wherein the image signal processor extracts depth information of the ROI from the depth image in the entire sensing region.

11. The 3D image processing apparatus of claim 10, wherein the image signal processor controls a light module to emit the emitted light where the on-time period of the emitted light is $T_{max}$, and extracts the depth information of the ROI based on a TOF between a reflected light and the emitted light where the on-time period of the emitted light is $T_{max}$.

12. A three-dimensional (3D) image processing apparatus, comprising:

an image signal processor to determine a Region Of Interest (ROI) in an entire sensing region of the 3D image processing apparatus and to control a pulse of an emitted light based on a depth from a reference point in relation to the image signal processor to the ROI; and a sensor unit to obtain a depth image under control of the image signal processor, wherein the image signal processor controls a light module to modulate the on-time period of the emitted light into a difference $(T_2-T_1)$ between $T_2$ and $T_1$ and $T_2$ being obtained by converting a starting point $Z_1$ and an end point $Z_2$ of the ROI into a Time of Flight (TOF), respectively.

13. The 3D image processing apparatus of claim 8, wherein the image signal processor determines whether to reset the ROI for each frame of the depth image provided from the sensor unit.

14. The 3D image processing apparatus of claim 8, wherein the image signal processor determines an ROI of an $m^{th}$ frame of the depth image, provided from the sensor unit, using an $m-1^{th}$ frame of the depth image provided from the sensor unit.

15. A three-dimensional (3D) image processing apparatus, comprising:

an image signal processor to determine a Region Of Interest (ROI) in an entire sensing region of the 3D image processing apparatus and to control a pulse of an emitted light based on a depth from a reference point in relation to the image signal processor to the ROI; and a sensor unit to obtain a depth image under control of the image signal processor, wherein the sensor unit modulates a duty cycle of a first transfer signal and a duty cycle of a second transfer signal to be identical to a duty cycle of the pulse-controlled emitted light.

* * * * *

UNITED STATES PATENT AND TRADEMARK OFFICE
CERTIFICATE OF CORRECTION

PATENT NO. : 8,369,575 B2  Page 1 of 1
APPLICATION NO. : 12/591218
DATED : February 5, 2013
INVENTOR(S) : Seong Jin Kim It is certified that error appears in the above-identified patent and that said Letters Patent is hereby corrected as shown below:

In the Claims

Column 8, Line 55, In Claim 1, delete "light" and insert -- light, --, therefor.
Column 10, Line 38, In Claim 12, delete "$T_1$ and $T_2$" and insert -- $T_1$, $T_1$ and $T_2$ --, therefor.

Signed and Sealed this
Eleventh Day of June, 2013

Teresa Stanek Rea
*Acting Director of the United States Patent and Trademark Office*